United States Patent
Ardagna

(10) Patent No.: US 8,622,429 B2
(45) Date of Patent: Jan. 7, 2014

(54) SWIVELING WHEEL TRAILER WITH EASY LOADING TILTING HITCH, THREE POINT RESTING POSITION, STEERING GEOMETRY AND RECEIVER HITCH COUPLING

(76) Inventor: Ned Anthony Ardagna, Chula Vista, CA (US)

(*) Notice: Subject to any disclaimer, the term of this patent is extended or adjusted under 35 U.S.C. 154(b) by 1180 days.

(21) Appl. No.: 12/322,225

(22) Filed: Jan. 30, 2009

(65) Prior Publication Data
US 2009/0194968 A1 Aug. 6, 2009

Related U.S. Application Data

(60) Provisional application No. 61/062,933, filed on Jan. 30, 2008, provisional application No. 61/066,517, filed on Feb. 21, 2008.

(51) Int. Cl.
*B62D 21/04* (2006.01)

(52) U.S. Cl.
USPC ........ 280/786; 280/789; 280/493; 280/415.1; 280/407.1

(58) Field of Classification Search
USPC .................. 280/786, 789, 787, 202, 204, 400, 280/124.162, 414.1, 414, 414.3, 493
See application file for complete search history.

(56) References Cited

U.S. PATENT DOCUMENTS

| 2,718,431 A * | 9/1955 | Pietroroia | 298/22 R |
| 4,397,476 A * | 8/1983 | Bolyard et al. | 280/656 |
| 7,059,626 B2 * | 6/2006 | Koch | 280/656 |

* cited by examiner

Primary Examiner — Jeffrey J Restifo
Assistant Examiner — Erez Gurari

(57) ABSTRACT

A high-performance, light-duty, utility trailer that is pulled by a tow vehicle utilizing a two point coupling to the tow vehicle and a swiveling axle assembly. This novel design includes a tilting hitch assembly attached to the trailer frame and swiveling casters attached to the rear corners of the trailer frame, creating a three point "landing gear" for easy installation onto the tow vehicle and providing good un-hitched mobility allowing the trailer owner to easily move the trailer out-of-the-way when stored between each use. A wheel swiveling assembly that can be configured to provide steering geometry capable of being customized to accommodate driving habits and road conditions. A two point hitch assembly that allows the removal of adaptors when not in use for both functional and aesthetic purposes.

7 Claims, 4 Drawing Sheets

Figure 1:
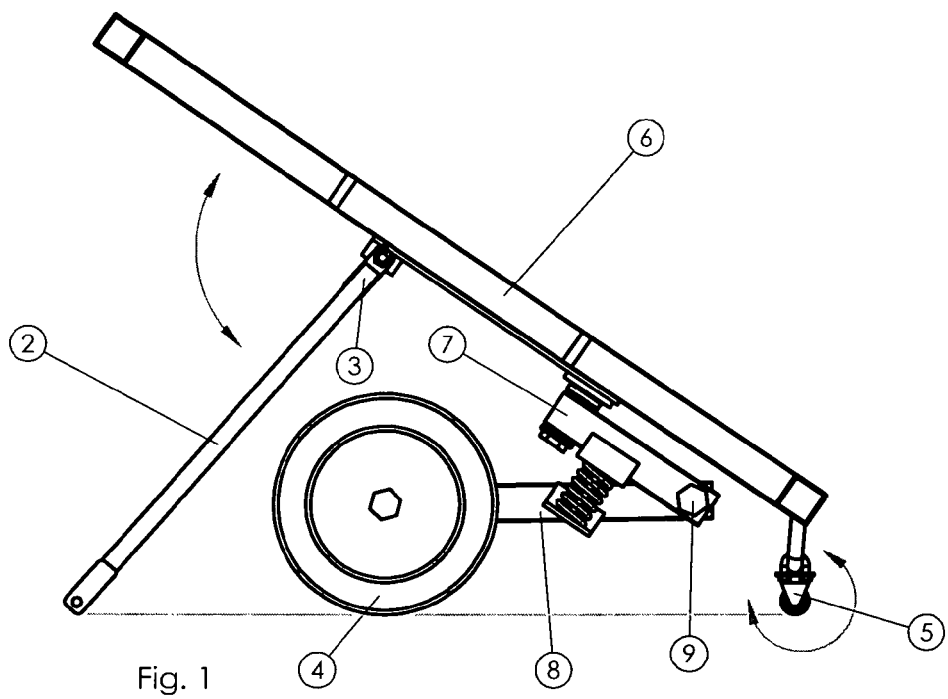

SWIVELING WHEEL TRAILER WITH EASY LOADING TILTING HITCH, THREE POINT RESTING POSITION, STEERING GEOMETRY AND RECEIVER HITCH COUPLING

This application claims the benefit of U.S. Provisional Application No. 61/062,933, filed Jan. 30, 2008, and No. 61/066,517, filed Feb. 21, 2008.

I. BACKGROUND OF THE INVENTION

1. Field of the Invention

Frequently a homeowner, or a handicapped person, or a coach, or a soccer mom, has an everyday requirement to transport more than the ordinary sedan type vehicle can transport without needing to resort to a truck or other large "utility type" vehicle. Trailers are not a popular alternative to this everyday utility requirement due to the difficulty of backing the vehicle up with a conventional trailer attached. With the ever increasing cost of fuel an alternative to the large utility type vehicle is necessary, and a trailer attached to an economically operated vehicle should be a consideration.

Now, with the growing emphasis on smaller, lighter more fuel efficient, environmentally friendly vehicles, along with the financial crisis affecting millions of Americans, the need is created for a form of utility device/accessory that attaches to light duty vehicles, including the new hybrid type vehicles. This unique invention describes a ultra-light-weight trailer system that is easy to install onto the tow vehicle, stores in the space of a wheelbarrow, has steering geometry, can be sold over the internet & shipped worldwide by UPS (or its shipping equivalent) and does not have the ugly qualities of the vehicle hitches currently available.

Methods for turning a sedan type vehicle into a light utility vehicle exist but each comes with its own operational problem, as follows:

a) The traditional utility trailer consisting of at least two wheels located at or near the rear of the trailer coupled to the tow vehicle through a single point hitch. This type of trailer has the "back-up" problem that has discouraged drivers from even considering using a trailer.

b) Basket/platform type utility system that plugs into a conventional receiver type vehicle hitch assembly and hanging from the back of the vehicle. This system does not have a back-up problem associated with a traditional trailer but it is limited to use on large vehicles and even when used on a large vehicle the system has a very limited capacity.

c) The swiveling wheel trailer which also has a long history but has not been a consideration by most drivers. With this method a trailer is attached to the tow vehicle through a two point hitch and uses a rear tire that swivels/rotates 360 degrees. This solution solves the back-up problem but the trailer is impossible to hitch alone, is difficult to move around once unhitched from the tow vehicle, then when unhitched, the vehicle is left with an ugly two point hitch installed, and has an alleged bounce problem under certain circumstances.

The present novel invention describes a swiveling wheel trailer that solves the hitching problem by using a three point resting position (landing gear) created by resting the trailer on casters capable of rotating 360 degrees attached at the rear corners of the trailer frame and the large trailer tire. This resting position, along with the tilting hitch, allows installation onto the tow vehicle without requiring at least two people to steady the trailer on its swiveling rear wheel. Additionally, when the trailer is disconnected from the tow vehicle the difficulty of balancing the trailer on its "swiveling" wheel for movement to storage is solved by the installation of swiveling casters at the rear corners of the trailer frame. The trailer can now be moved with a simple push to its hitching or storage location. Furthermore, the trailer resting in the three point position, on its swiveling casters and trailer wheel, can be stored in the space normally occupied by a wheelbarrow; convenient for use by residents of apartments and condominiums.

A further element of the present invention relates to a frame that is unique such that superior strength is obtained in an ultra light frame allowing for the internet marketing capability of the described trailer. This unique design forms a bow-tie shape with a strong back for attaching the swivel wheel and tilting hitch coupling arms, with frame components radiating from the strong back to the front and rear trailer frame cross members.

A further element of the present invention relates to the configuration of the swivel axle assembly by utilization of a swing frame situated with the swing frame attached to the swiveling assembly ahead of the king pin and the trailer wheel trailing behind the kingpin in such a manner as to cause leverage on the tire while in operation, creating steering geometry and allowing for trailer steering that can be tailored to driving conditions.

Namely, the present invention relates to a light-weight utility trailer that is easy to install onto the tow vehicle, is designed to be used with tow vehicles not normally thought of as being tow vehicles, which when installed may be used without the normal back-up hassle associated with using a trailer. More particularly the invention describes a trailer utilizing a unique three point resting position that allows the easy movement of the trailer while it is not in use, a unique and novel tilting hitching system allowing the installation of the trailer onto the tow vehicle while in the three point resting position, a unique swiveling king-pin/swing-frame system that creates adjustable steering geometry and a description of unique adaptors for hitching the trailer to the tow vehicle which can be removed from the tow vehicle when the hitch is not in use, for aesthetic reasons.

2. Description of the Related Art

Single wheeled trailers using a swiveling wheel capable of making 360 degree rotations are not new or novel. Many patents exist describing some element of the single swiveling wheel trailer design including: U.S. Pat. No. 3,784,230 (Worral, 1974) a system that describes a secondary use for a single wheeled trailer as a wheelbarrow; U.S. Pat. No. 7,387,308 (Williamson 2008) describing a single wheel trailer with a complicated stabilizing hitch; U.S. Pat. No. 6,042,138 (Shreck 2000) a trailer for use behind a motorcycle; U.S. Pat. No. 4,645,230 (Hammons 1987) a trailer that is collapsible and U.S. Pat. No. 6,626,449 (Hazen 2003) describing a system using two swiveling wheels rather than a single wheel and more. None of these patents address one of the biggest problems with using a single "swiveling" wheel trailer system, which is the problem of attempting to hitch the trailer to the tow vehicle without assistance. This type of trailer must be balanced on its single swiveling wheel while the two point hitch is connected to the tow vehicle through whatever means is employed for the coupling to the vehicle.

Therefore, it would be highly desirable to have a mechanism for attaching a single wheel trailer that solves the balancing problem and allows for coupling to the tow vehicle by a single person without any assistance.

Another issue with using the single swiveling trailer configuration is moving the trailer around by hand while it is not attached to the tow vehicle. This problem is addressed by U.S. Pat. No. 4,645,230 (Hammons 1987) describing a method for adding supports to the front of the trailer near the tow vehicle. This requires the installation of additional accessories and requires that the trailer maintain its normal, in use position, requiring extra space when not in use during storage. U.S. Pat. No. 3,784,230 (Worrall 1974) describes a trailer that when not in use may be used in place of a wheelbarrow but does not describe an easy method for moving the trailer without needing to balance the trailer on its swiveling wheel.

Therefore, it would be highly desirable to have a method for easily moving a single wheel trailer around by hand when not coupled to the tow vehicle that does not require installation of additional supporting accessories and allows for easier storage in the space normally occupied by a wheelbarrow.

Patents exist which describe frames that are in most aspects conventional in shape and design. U.S. Pat. No. 4,078,821 (Kitterman 1978) describes a frame using channels to hold motorcycles. U.S. Pat. No. D477,797 S (McCoy 2003) describes a trailer frame in a "U" shape. U.S. Pat. No. 6,042,138 (Shreck 2000) describes a trailer for installation on a motorcycle. All of these frames are conventional in configuration and not suitable for the newer light duty hybrid type of vehicles, which require lightweight compact durable frames. Additionally, to be competitively marketed today the internet is necessary, further demanding a non-traditional approach to a trailer frame.

Therefore it would be highly desirable to have a trailer frame that met the dual objectives of being light enough for shipment worldwide from an internet source while being strong enough for use behind any tow vehicle.

Patents exist that address a performance complaint of users of single swivel wheeled trailers that the trailer bounces when in use. U.S. Pat. No. 4,372,569 (Otterson 1983) describes a trailer wheel using counter balanced springs for the purpose of limiting wheel travel and bounce. U.S. Pat. No. 7,387,308 (Williamson 2008) describes a load stabilizing hitch that is designed to limit roll of the trailer when fitted in certain applications and U.S. Pat. No. WO 2004062993 (McCoy 2004) describes a method for limiting bounce through a lower center of gravity. The bouncing problem is caused by the wheel becoming disengaged with the ground when cornering which is not addressed by any of the above inventions.

Therefore, it would be highly desirable to have a trailer that limited the bouncing problem of the single wheeled trailer by addressing steering a single wheeled trailer.

Owners of sedan type vehicles and vehicle enthusiasts desire to have a clean appearing vehicle that could also be used for towing and light utility uses that is easy to operate, such as a single wheel trailer that has a swiveling wheel/axle assembly. This style of trailer requires a two point hitch coupling at the vehicle. Typically these hitches are large and not aesthetically pleasing. especially when the trailer is not in use. U.S. Pat. No. 4,484,759 (Zwick 1984) describes a two point hitch that is complicated and requires adding a large assembly to the vehicle bumper. Other inventions have been approved simply using two ball hitch assemblies to the bumper rather than a single ball hitch used by conventional trailers. All of these inventions use an attachment to the bumper that is aesthetically unpleasing when the trailer is unhitched from the vehicle and undesirable in today's market place.

Therefore, it would be highly desirable to have a hitch assembly for a swiveling single wheel trailer that is removable creating an aesthetically pleasing appearance when the trailer is not in use.

II. SUMMARY OF THE INVENTION

Figure 2:
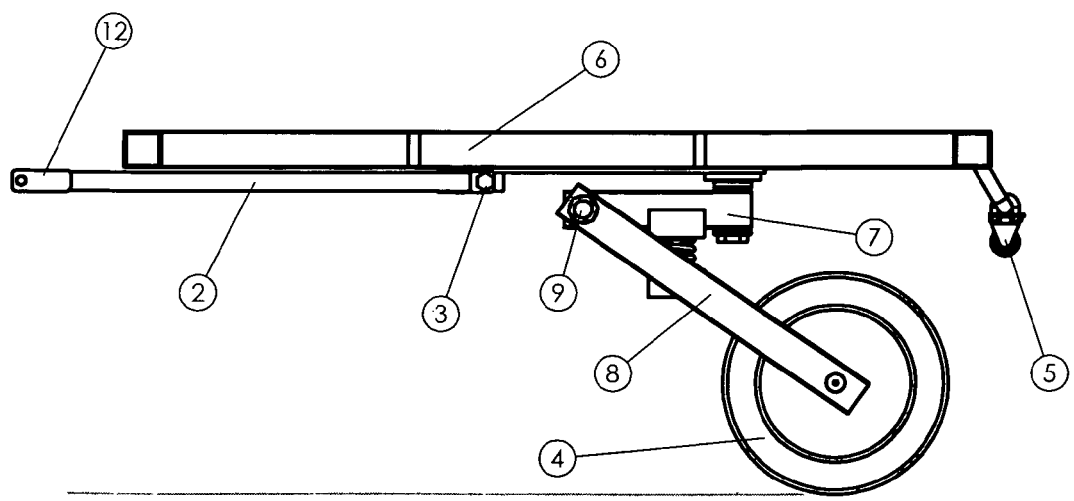
Figure 3A:
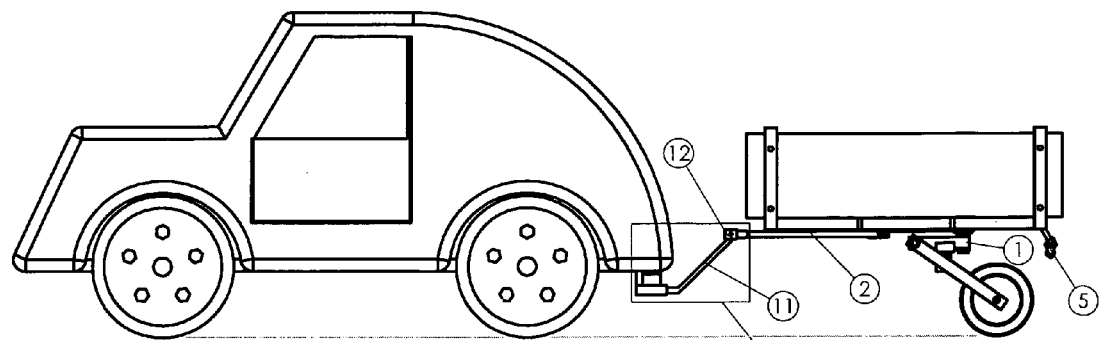

This novel invention solves the hitching problem by allowing the trailer to be in a stable, 3 point, tilted position (FIGS. 1 & 4) when not hitched to the tow vehicle. This is accomplished by resting the trailer on the rear edge of the trailer frame and the trailer tire. The trailer frame is equipped with pivoting tilting two point vehicle hitch arm assembly (FIGS. 1 & 4) connected to the trailer frame (FIGS. 5 and 6). The two arms of the tilting hitch assembly may operate independently of each other or may be linked together. Once the trailer is hitched to the tow vehicle the trailer is tilted back & locked into the tow position, and is now ready for use (FIGS. 2 & 3A). This method provides for easy coupling to a tow vehicle by a single person with out significant physical effort, even if the trailer is slightly loaded.

Another element of this novel invention is the placement of swiveling casters (FIGS. 1, 2, 5 & 6) at or near the corners of the rear edge of the trailer frame (FIGS. 5 & 6), allowing the trailer to be easily moved around on the swiveling casters and the trailer tire. The swivel casters along with the actual trailer tire form a three point "landing gear" for stability and easy movement for storage or hitching. A small trailer in this configuration easily stores in the space of a wheelbarrow solving the problem of storing the trailer when not in use. The everyday utility transportation problem using a trailer with an economy vehicle, not having the backing-up problem, is now solved.

A further novel element of this invention is the unique configuration of the trailer frame (FIGS. 5 & 6). Because the support required for the swiveling wheel is along the centerline of the trailer frame, the frame is configured with a strongback centerline support that spreads out to the full width of the trailer at the front and rear of the trailer, in what is best described as a "bow-tie" shape (see FIGS. 5 & 7). This configuration provides a strong stable platform for the trailer body and swiveling wheel assembly while still maintaining a very low weight. This would allow for the use of an ultra-light tow vehicle, along with a reduced shipping cost from the supplier to customer. Among the objective of this design is to provide for a product that can be purchased via the internet and shipped worldwide by a parcel delivery service.

Figure 3B:
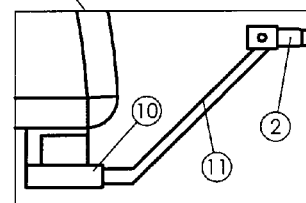

A further novel element of this invention is a solution for the ugly hitch problem while still maintaining a stable two point hitch by utilizing two small receiver hitch assemblies attached to the vehicle (see FIG. 3B) incorporated into the hitch assemblies that are attached to the vehicle frame. The hitch assemblies may vary in size and shape to meet the requirements of a particular vehicle. When a trailer is to be coupled to the tow vehicle and "hitched-up" adaptor arms (see FIGS. 3A, 3B & 4) configured for a particular vehicle application (either universally or custom) are inserted into the receiver in the hitch assemblies and the trailer is then coupled to the tow vehicle for use (FIGS. 3A & 3B).

When the trailer is no longer needed and is uncoupled from the tow vehicle the adaptor coupling bars can be removed from the vehicle, leaving only the small receiver sockets visible. This would create a clean appearance on the vehicle, concealing its use as a trailer tow vehicle.

This invention would make trailering a desirable option for light utility uses for the driver of sedan type vehicles, car enthusiasts or any vehicle owner that desires an easy to use trailer that does not have the "ugly" hitch visible on the vehicle.

III. DESCRIPTION OF THE DRAWINGS

FIG. 1—Side View of Trailer in the TILTED position resting on its swivel casters, located at the corners of the trailer frame, and the main trailer tire with the tilting hitch components in the down, storage position.

FIG. 2—Side View of Trailer in the TOW position with the tilting hitch components in the up, hitched position.

FIG. 3(A)—Side View of Trailer hitched to vehicle in the TOW position showing the hitch assembly and the coupling adaptors installed on the vehicle FIG. 3(B) Detail View of hitch assembly attached to vehicle below the bumper and showing the coupling bars, describing the hitch adaptor system.

Figure 4:
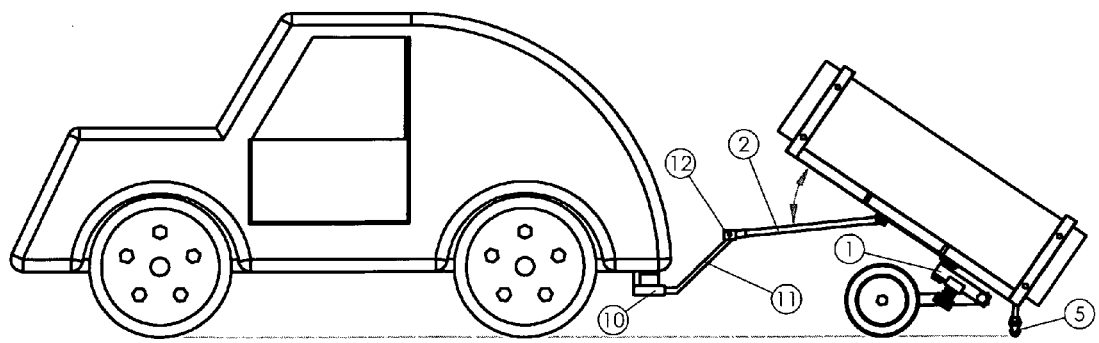
Figure 5:
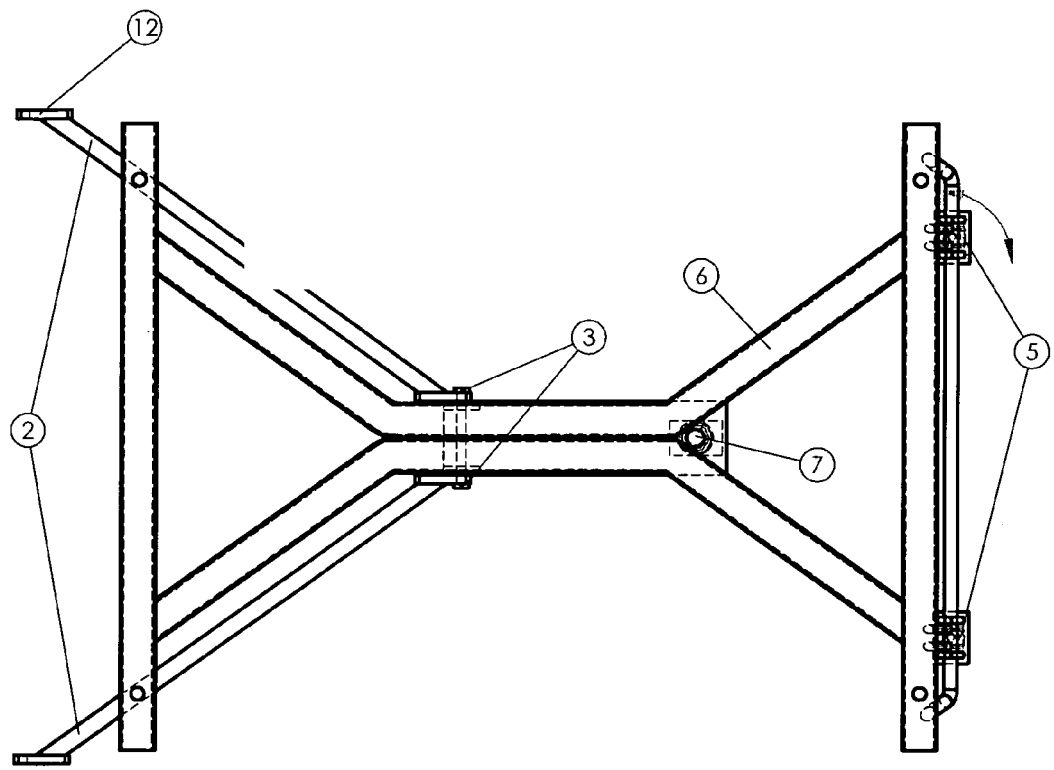
Figure 6:
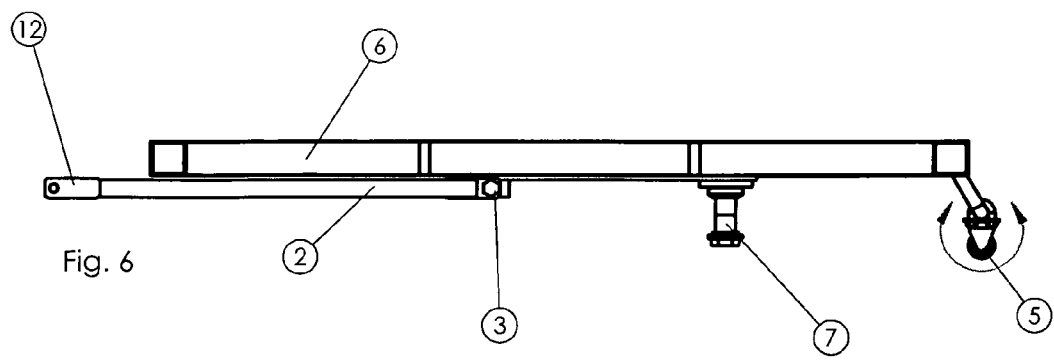

FIG. 4—Side View of Trailer hitched to vehicle in the TILTED position resting on its swivel casters and trailer wheel, showing the hitch adaptor system installed on the vehicle FIG. 5—Top View of a Trailer Frame with tilting hitch components, swiveling casters and kingpin installed.

FIG. 6—Side View of the Trailer Frame with tilting hitch components, swiveling casters and and kingpin installed.

Figure 7:
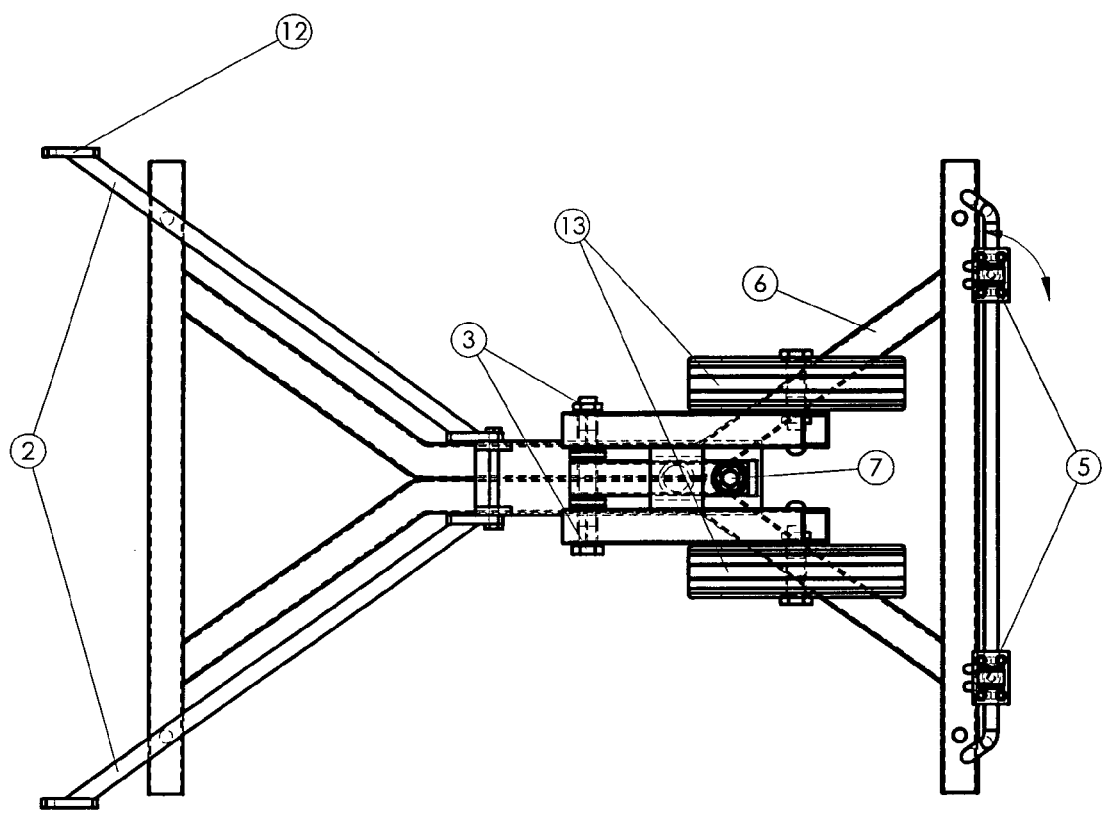

FIG. 7—Bottom View of the Trailer Frame with dual wheel assembly installed.

IV. DETAILED DESCRIPTION AND PREFERRED EMBODIMENTS

A swivel wheeled trailer utilizing two tilting hitch arms (2) attached to the frame in two locations (3), located on the right and left sides of the trailer frame, in such a manner that the hitch arm is allowed to pivot up and down freely from the frame (6) and of sufficient length to, when in the Tow position to engage a latching mechanism on the front edge of the frame and protrude in sufficient length to be attached/hitched to a tow vehicle by a two point hitching assembly (see FIGS. 3 & 4) A swivel wheeled trailer that may be tilted into a three point resting position (see FIGS. 1 & 5) landing on its trailer wheel (4) and two casters capable of swiveling 360 degrees (5), allowing for the trailer to be easily moved while not hitched to a tow vehicle for storage or easy attachment to the tow vehicle. The two tilting hitch arms (2) may operate independently of each other or may be coupled together.

A frame (6) for a swivel wheeled trailer that has a unique light weight design in a shape incorporating a strong back configuration along the centerline of the trailer frame, allowing for the attachment of the trailers swiveling assembly at the king pin (7) and the tilting hitch arms (2 & 3) with supports radiating from the strong back portion of the frame to, points located near the right and left frame edges at the forward and rear trailer frame supports. Forming a configuration in the shape of a bow-tie (see FIGS. 5 & 7).

A swivel wheeled trailer that utilizes two wheels attached to the swing frame side by side (13) creating a dual wheel configuration to increase the load capacity of the trailer (see FIG. 7).

A swiveling assembly (1) for a swivel wheeled trailer configured with a king pin (7) and swing frame (8) that places the swing frame attachment (9) to the swiveling assembly ahead of the king pin (7) and the trailer wheel (4), when in the tow position, behind the king pin (7) in such a manner that leverage created by the relationship of the trailer wheel (4), the attachment of the swing frame (8) and the king pin (7) affects the steering quickness and steering geometry of the trailer. This relationship may be altered and tailored to different driving habits and road conditions. (See FIGS. 2, 3A & 7)

A hitch receiver assembly (10) installed on the tow vehicle at two locations on the vehicle frame member located on the right and left sides of the vehicle in a manner so as to create the two point hitch attachment necessary for a swivel axle trailer. The hitch assembly includes a receiver point where an adaptor arm (11) is inserted into the hitch assembly at the receiver points (see FIG. 3B). The adaptor arms can be manufactured in custom lengths to facilitate leveling the trailer for operation or a universal style can be utilized that includes a variety of points at different heights to allow leveling the trailer by selection the proper point. The assemblies must allow the trailer to hinge at the point where it hitches to the vehicle (12).

What is claimed is:

1. A swiveling wheel trailer and frame comprising:
   a) a bow-tie shaped strong member frame further comprising strong back member configured in a central location with members radiating angling towards but not necessarily to said trailer's front right and left corner edges and rear right and left corner edges, wherein said radiating frame members are attached to cross member located transverse across ends of said radiating frame members across the trailer's front from right to left corner edges and across the trailer's rear from right to left corner edges;
   b) a swiveling assembly, further comprising of a king pin, a swing frame, one wheel, one wheel attachment on said swing frame, and a swiveling assembly attachment located in the rear cleft of rear radiating frame members;
   c) a tow hitch, further comprising a tow vehicle dual hitch receiver points, two adaptors, and two hingeable hitching arms, wherein said hitching arms are attached to two independently operated tilting arms;
   d) a tilting frame stabilizer, further comprising two independently operated tilting arms attached to pivoting attachment means located on left and right side of strong back member near inflection outward of front radiating members, a caster attachment means attached to rear cross member, and two 360o swivelable casters attached near width of trailer.

2. A swiveling wheel trailer and frame thereof comprising a trailer frame having a bow-tie configured strong back member in a central location with configured members radiating from a central location angling towards but not necessarily to said trailer's front right and left corner edges and rear right and left corner edges, wherein said configured frame members are attached to cross members located transverse across ends of said radiating flame members across the trailer's front from right to left corner edges and across the trailer's rear from right to left corner edges, with said frame further comprising at least one wheel, swiveling means, hitching means, tilting frame stabilizing means, and swiveling means attachment means;
   wherein said hitching means comprises a tow vehicle dual hitch receiver points, at least two adaptors, and at least two hingeable hitching adaptor arms, wherein said hitching adaptor arms are attached to at least two independently operated tilting arms.

3. The swiveling wheel trailer and frame according to claim 2, wherein said swiveling means comprises of a swiveling assembly further comprising of a king pin, a swing frame, at least one wheel, and at least one wheel attachment means on said swing frame, wherein said swiveling assembly is attached to said frame utilizing said swiveling means attachment means.

4. The swiveling wheel trailer and frame according to claim 3, wherein the number of wheel attachment means is two and number of wheels is two, wherein the wheel attachments are on either side of said swing frame.

5. The swiveling wheel trailer and frame according to claim 2, wherein said tilting frame stabilizing means comprises at least two independently operated tilting arms, a pivoting attachment means, at least two 360o swivelable casters, and swivelable caster attachment means.

6. The swiveling wheel trailer and frame according to claim 5, wherein said pivoting attachment means are located on right and left side of said strong back member near inflection outward of said front radiating members, wherein said tilting arms are attached to said pivot attachment means, wherein said caster attachment means is a bar attached to underside of rear cross member, and 2 casters attached to said bar located 1 each on left and right side of bar near width of trailer.

7. The swiveling wheel trailer and frame according to claim 2, wherein said swiveling means attachment means in the rear cleft of the rear radiating members.

* * * * *